July 4, 1944.  E. R. MORANDO  2,352,966
BABY'S CARRIAGE SLEIGH ATTACHMENT
Filed Feb. 5, 1942

INVENTOR
EMANUEL R. MORANDO
BY
Robert R Bronner
his ATTORNEY

Patented July 4, 1944

2,352,966

UNITED STATES PATENT OFFICE 2,352,966

BABY'S CARRIAGE SLEIGH ATTACHMENT

Emanuel R. Morando, New York, N. Y.

Application February 5, 1942, Serial No. 429,614

2 Claims. (Cl. 280—8)

This invention relates to a convertible carriage and sleigh, particularly for a sleigh runner attachment to the wheels of infants' carriages and hand pushed carts, or any kind of small vehicles.

An important feature of this invention, is the interchangeable runners that are attachable and detachable circumferentially to and from the wheels of any type of a carriage, cart or vehicle, and are adaptable to be used from one carriage to another. Suitable clamping means are used on the saddles to secure the runners to the wheels, and once set, are in position for all winter use. When not in use, the runners with their saddles and clamping parts may be secured onto the axles under the body of carriage. In this way the children may use the same carriage or cart all the year round, and the young children too young for regular sleds may be taken out for a sleigh ride in the carriage or cart.

Another important feature of this invention, is the adjustable means for wheels varying in sizes, tread and the wheel base, the front wheels if smaller than rear wheels, and each pair of front and rear wheels are instantly clamped to the front and rear saddles secured onto the runners. These saddles may also be termed stationary half-wheel casings, guards or wheel supporters.

Another important feature of this invention, is in an individual runner for each wheel, each provided with the saddle or wheel supporting members. These individual runners are adaptable for rough and uneven ground, whereon, these shorter runners slide smoothly due to their self aligning and constant contact upon the ice or snow and their universal and swivel-like movement with the free rotary movement of each wheel.

Other important features of this invention will appear as the description proceeds in the following specification, accompanied by the annexed drawing, in which Figure 1 is a perspective view of an infant's carriage having the saddle runners attached thereto.

Figure 1:
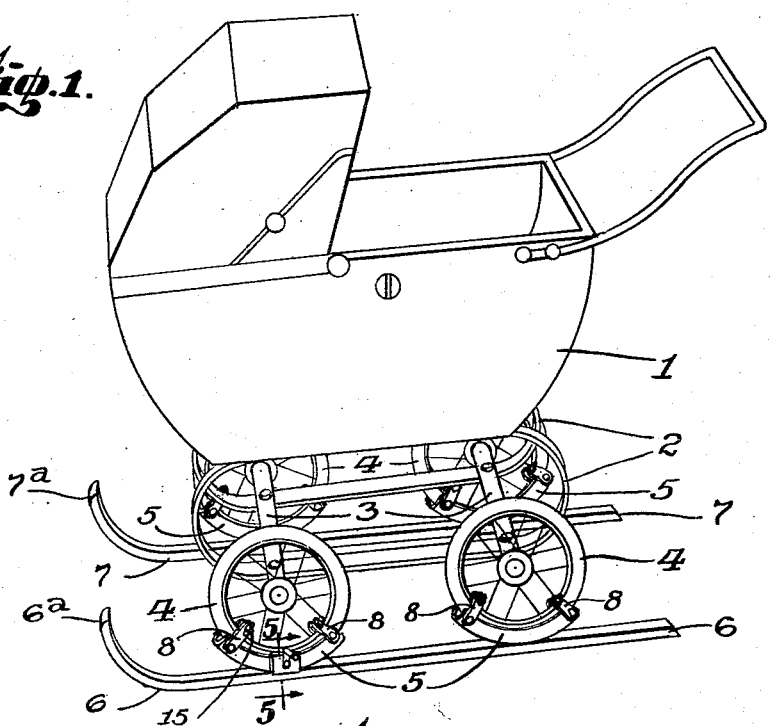

Referring to the drawing, the numeral 1 indicates the body of an infant's carriage, provided with the usual suspension upon the spring members 2 that are secured to the axles 3 upon which the wheels 4 are rotatable.

Figure 3:
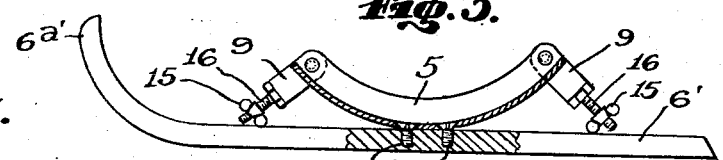
Figure 3 is an enlarged partial sectional view of one of the single runners.
Figure 4:
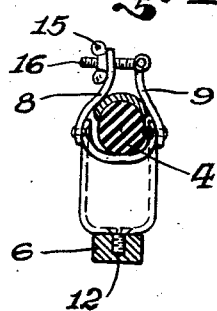
Figure 4 is a cross-sectional view at any of the clamping portions.
Figure 5:
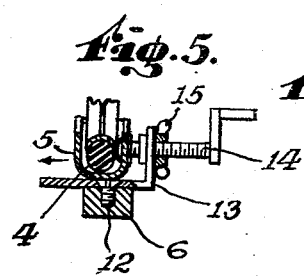
Figure 5 is a partial cross-sectional view taken on line 5—5 of Figure 1, showing the adjusting means for the front wheels.

The above carriage is adaptable to be converted into a carriage-sleigh, as shown in Figure 1, by lifting the carriage wheels 4 into each of the arcuated saddles 5 secured onto each of the runners 6 and 7, and are then fastened by clamping members 8 and 9, pivotally secured at the ends of the arcuate saddle members 5, also to be known as wheel supporting members 5. These arcuated saddle members 5 are secured to the runners 6 and 7 by any suitable means, such as for example, by screws 12, as shown in Figures 3, 4 and 5, or may be made solid with the runners, if so desired. A web bracket member 13 is provided upon each front portion of the runners 6 and 7, and a hand screw 14 is used therewith to move in or out laterally in the front saddles 5 to fit the front wheels. The clamping bands 8 and 9 are pivotally arranged on the ends of the saddle members 5, see Figures 3 and 4, whereby they may be swung around over the tire and rim of the wheels 4 and then securely clamped in a slotted portion 16a of one of the clamping bands by a wing nut 15 and a hinged bolt 16 the wing-nut being arranged in one of the clamping bands while the other associated clamping band has a threaded hole to receive the threaded end of said hinged-screw, each clamping band being loosely pivoted to the flange portions of the saddle members, thereby providing onto the saddles circumferentially a brace-like support for the wheels 4 and carriage 1.

Figure 2:
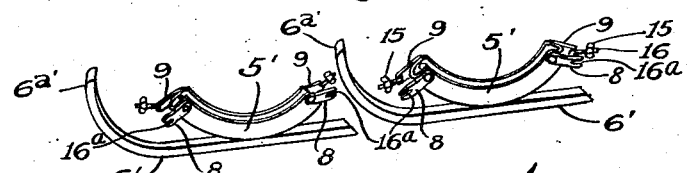
Figure 2 is a perspective of a much preferred form showing the single or individual front and rear saddle runners.

In Figure 2, separate runners 6' are provided for each individual wheel 4, whereby an oscillating and free movement is obtained for each runner in sliding over uneven ground covered with ice or snow. In the original form of runners 6 and 7, there is no such free movement as both wheels of the left and right sides of the carriage are secured onto the two full length runners 6 and 7, one for each side.

Figure 6:
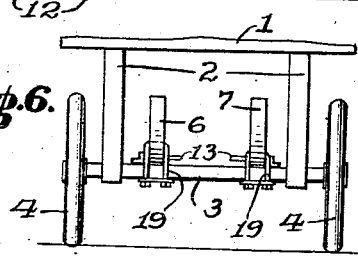
Figure 6 is an end view of the same carriage shown in Figure 1, showing the runners attached onto the axles of the wheels, when not desired for use.

When desired not to use the two runners 6 and 7, they may be clamped by the clips 19 onto the front and rear axles 3, as shown in Figure 6.

Also the single saddle wheel runners 6' may also be similarly secured to the axles 3, all of which are removable for storage during the summer until they are to be used again during the coming winter.

The runners 6, 6' and 7 may be made of square steel or any solid or tubular metal, with preferably a curved front end portion 6a, 6a' and 7a. The arcuated saddle members 5 are preferably of channel-like shape, and are secured at the medial portion to each runner, the saddle members being of sufficient size to allow the wheels 4 to be tangently fitted therein. Where wheels vary in diameter, the open arcuate clearance of the saddles 5 allow for a tangent fitting.

It is to be understood that the clamping members 8 and 9 may be substituted by other means of attaching and securing the runners to the wheels 4, and any adjustment feature to provide for different wheel centers may be adopted, just so the runners may be instantly attached to any size of carriages and carts, and wheels therewith.

Also similar parts will be notated by the same numeral and primed accordingly in alternative forms.

It is to be further understood that any part shown in the drawings and hereinbefore described may be changed and altered to accomplish the same purpose, and certain minor parts may be omitted or additional parts added, without departing from the spirit of the invention, providing same comes within the scope of the appended claims.

Having thus described my invention what I claim as new and desire by Letters Patent of the United States of America, is as follows:

1. In a runner attachment for wheels of a vehicle of the character described, the combination of a one piece bar having one end curved upwardly, a channel-like saddle member secured onto said bar, the end portions of said saddle member curving upwardly from its medial secured position, said end portions of said saddle member provided with clamping band members, one of which has a hinged bolt and nut thereon, and the other a slotted end portion, said bar and saddle members adapted to be fitted to the rim portion of a vehicle wheel and securely clamped thereon by said band member, hinged bolt and nut.

2. In a runner attachment for wheels of a vehicle of the character described, the combination of a one piece bar member having one end curved upwardly, curved saddle members suitably arranged in the front and rear portions of said bar member, said front saddle member secured to a hand screw arranged onto an angle bracket secured onto said bar member, said saddle members having clamping band members loosely arranged at the end portions, one of which is provided with a hinged bolt and nut, and the other with a slotted end portion, a pair of said runners adapted to be secured to the rim portions of all of the wheels of a vehicle, by means of said hinged bolt and nut engaging said slotted portion, said hand wheel adjusting the saddles to any desired width of the front wheels.

EMANUEL R. MORANDO.